(12) United States Patent
Rohde

(10) Patent No.: US 10,021,891 B2
(45) Date of Patent: *Jul. 17, 2018

(54) ENERGY-EFFICIENT APPARATUS FOR MAKING CHEESE

(71) Applicant: Rohde Brothers, Inc., Plymouth, WI (US)

(72) Inventor: Michael E. Rohde, Plymouth, WI (US)

(73) Assignee: Rohde Brothers, Inc., Plymouth, WI (US)

( * ) Notice: Subject to any disclaimer, the term of this patent is extended or adjusted under 35 U.S.C. 154(b) by 883 days.

This patent is subject to a terminal disclaimer.

(21) Appl. No.: 14/217,763

(22) Filed: Mar. 18, 2014

(65) Prior Publication Data

US 2014/0199457 A1   Jul. 17, 2014

Related U.S. Application Data

(63) Continuation of application No. 12/543,058, filed on Aug. 18, 2009, now Pat. No. 8,714,079.

(51) Int. Cl.
*A23C 19/02* (2006.01)
*A01J 11/00* (2006.01)
*A01J 25/11* (2006.01)

(52) U.S. Cl.
CPC ............ *A23C 19/02* (2013.01); *A01J 11/00* (2013.01); *A01J 25/11* (2013.01)

(58) Field of Classification Search
CPC ......... A01J 25/11; A01J 25/111; A01J 25/112; A01J 25/114; A01J 25/115; A23C 19/02–19/093

USPC .............. 99/453, 456; 426/491; 165/10, 66, 165/104.19, 104.28, 104.31, 140
See application file for complete search history.

(56) References Cited

U.S. PATENT DOCUMENTS

| | | |
|---|---|---|
| 1,042,912 A | 10/1912 | Hay |
| 1,044,851 A | 11/1912 | Behm |
| 2,712,504 A | 7/1955 | Coulter |
| 2,846,320 A | 8/1958 | Wittwer |

(Continued)

OTHER PUBLICATIONS

Ex parte Rodriguez et al., BPAI, Appeal 2008-000693, Oct. 1, 2009.*

*Primary Examiner* — David Angwin
*Assistant Examiner* — John J Norton
(74) *Attorney, Agent, or Firm* — Michael Best & Friedrich LLP

(57) ABSTRACT

An apparatus for making cheese including a whey conduit, a milk conduit, and a heat exchange device between the whey conduit and the milk conduit. Preferably, the heat exchange device includes a heat transfer circuit including a heat transfer conduit, heat transfer medium in the heat transfer conduit, a whey heat exchanger between the whey conduit and the heat transfer conduit, and a milk heat exchanger between the heat transfer conduit and the milk conduit. A thermal storage device can be in thermal contact with the heat exchange device to allow heat energy from the whey to be accumulated and stored for future use in heating incoming milk. The thermal storage device includes a thermal storage conduit, a thermal storage heat exchanger between the heat exchange device and the thermal storage conduit, thermal storage medium in the thermal storage conduit, and a thermal storage tank.

7 Claims, 4 Drawing Sheets

Fig. 1

(56) References Cited

U.S. PATENT DOCUMENTS

| | | | |
|---|---|---|---|
| 3,382,917 A * | 5/1968 | Rice | F24D 11/00 122/32 |
| 3,707,770 A | 1/1973 | Timmins et al. | |
| 3,754,650 A | 8/1973 | Kautz et al. | |
| 3,853,172 A * | 12/1974 | McFarlan | F24F 3/10 165/210 |
| 3,961,077 A | 6/1976 | Kielsmeier | |
| 4,061,186 A * | 12/1977 | Ljung | F24F 3/147 165/101 |
| 4,096,586 A | 6/1978 | Badertscher et al. | |
| 4,190,576 A | 2/1980 | Thomson et al. | |
| 4,205,090 A | 5/1980 | Maubois et al. | |
| 4,254,698 A | 3/1981 | Savarese | |
| 4,310,476 A | 1/1982 | Nahra et al. | |
| 4,310,554 A | 1/1982 | Olson et al. | |
| 4,321,860 A | 3/1982 | Hazen | |
| 4,356,681 A | 11/1982 | Barnes | |
| 4,491,172 A | 1/1985 | Hitchin | |
| 4,514,094 A | 4/1985 | Buckholz, Jr. et al. | |
| 4,527,618 A * | 7/1985 | Fyfe | F24D 11/0221 126/635 |
| 4,542,034 A | 9/1985 | Aule et al. | |
| 4,591,463 A | 5/1986 | Nahra et al. | |
| 4,617,861 A | 10/1986 | Armstrong | |
| 4,675,194 A | 6/1987 | Gaffney | |
| RE32,695 E | 6/1988 | Nahra et al. | |
| 4,802,531 A * | 2/1989 | Nathenson | F28D 7/1653 165/104.23 |
| 4,997,662 A | 3/1991 | Lidman et al. | |
| 5,165,466 A * | 11/1992 | Arbabian | F24D 11/00 165/10 |
| 5,209,157 A | 5/1993 | Sanchez Rodriguez | |
| 5,232,720 A | 8/1993 | Nielsen | |
| 5,240,724 A | 8/1993 | Otto et al. | |
| 5,250,305 A | 10/1993 | Hamada | |
| 5,260,079 A | 11/1993 | Zettier et al. | |
| 5,324,529 A | 6/1994 | Brockwell | |
| 5,327,818 A | 7/1994 | Olivetti | |
| 5,360,055 A * | 11/1994 | Hup | A23L 3/22 165/66 |
| 5,375,510 A | 12/1994 | Miller et al. | |
| 5,429,829 A | 7/1995 | Ernster, Sr. | |
| 5,435,380 A * | 7/1995 | Yamada | F24F 5/0017 165/104.19 |
| 5,470,593 A | 11/1995 | Meilinger et al. | |
| 5,470,595 A | 11/1995 | Kopp et al. | |
| 5,476,675 A | 12/1995 | Lou et al. | |
| 5,503,064 A | 4/1996 | Scheel et al. | |
| 5,562,024 A | 10/1996 | Polny, Jr. | |
| 5,635,228 A | 6/1997 | Sponholtz | |
| 5,727,452 A | 3/1998 | Jensen | |
| 5,901,740 A | 5/1999 | Sanchelima | |
| 5,916,352 A | 6/1999 | Muzzarelli | |
| 5,955,128 A | 9/1999 | Bayevsky et al. | |
| 6,109,339 A * | 8/2000 | Talbert | F24D 11/0214 126/101 |
| 6,120,809 A | 9/2000 | Rhodes | |
| 6,158,499 A * | 12/2000 | Rhodes | F24F 5/0017 165/10 |
| 6,183,804 B1 | 2/2001 | Moran et al. | |
| 6,270,823 B1 | 8/2001 | Jolkin | |
| 6,468,574 B1 | 10/2002 | Zettier | |
| 6,688,214 B1 | 2/2004 | Kikuchi et al. | |
| 7,435,440 B2 | 10/2008 | Feldmeier | |
| 2004/0016699 A1 | 1/2004 | Bayevsky | |
| 2004/0139864 A1 | 7/2004 | Kopf et al. | |
| 2005/0160752 A1 * | 7/2005 | Ghoshal | G06F 1/203 62/259.2 |
| 2005/0249650 A1 | 11/2005 | Johannes Damhuis et al. | |
| 2006/0008570 A1 | 1/2006 | Shidara et al. | |
| 2007/0048403 A1 | 3/2007 | Thuli et al. | |
| 2007/0077332 A1 | 4/2007 | Moran et al. | |
| 2007/0178210 A1 | 8/2007 | Keller | |
| 2008/0131570 A1 | 6/2008 | Bokelmann et al. | |
| 2008/0314564 A1 * | 12/2008 | Nagaseki | G05D 23/19 165/104.31 |
| 2010/0252232 A1 * | 10/2010 | Reich | F28D 20/0034 165/48.1 |

\* cited by examiner

ENERGY-EFFICIENT APPARATUS FOR MAKING CHEESE

CROSS-REFERENCE TO RELATED APPLICATIONS

This application is a continuation of U.S. patent application Ser. No. 12/543,058, filed Aug. 18, 2009, the entire contents of which are hereby incorporated by reference herein.

BACKGROUND

The present invention relates to devices and processes for making cheese.

During the cheese-making process, milk is treated with an enzyme and bacteria to separate the milk solid portion (curd) from the liquid portion (whey). The curd is further processed into a cheese product, and the whey is removed and discarded or used for some other purpose. This process is commonly performed in a batch process and occurs at an elevated temperature, which requires that the incoming milk be heated prior to starting the curdling process.

SUMMARY

The present invention provides an apparatus and process for making cheese wherein the heat energy of the outgoing whey is utilized to heat the incoming milk. As a result significant energy savings can be achieved.

More specifically, an apparatus embodying aspects of the present invention includes a whey conduit, a milk conduit, a heat exchange device operatively positioned between the whey conduit and the milk conduit, and a thermal storage device in thermal contact with the heat exchange device. In one embodiment, the heat exchange device includes a heat transfer circuit including a heat transfer conduit, a heat transfer medium (e.g., comprising water) positioned in the heat transfer conduit, a whey heat exchanger operatively positioned between the whey conduit and the heat transfer conduit, and a milk heat exchanger operatively positioned between the heat transfer conduit and the milk conduit. Preferably, the heat transfer circuit further includes a pump capable of circulating the heat transfer medium in the heat transfer conduit.

The thermal storage device allows heat energy from the whey to be accumulated and stored for future use in heating incoming milk. The thermal storage device preferably includes a thermal storage conduit, a thermal storage heat exchanger operatively positioned between the heat exchange device and the thermal storage conduit, a thermal storage medium (e.g., comprising water) positioned in the thermal storage conduit, and a thermal storage tank coupled to the thermal storage conduit. Preferably, the thermal storage device further includes a pump capable of circulating the thermal storage medium in the thermal storage device. Also, it is preferred that the thermal storage tank comprise a cold storage tank for accumulating cold thermal storage medium and a hot storage tank for accumulating hot thermal storage medium.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

As used herein, the terms "hot" and "cold" are used for convenience to refer to fluid (e.g., whey, milk, water, etc.) or portions of the apparatus (e.g., heat exchangers, pumps, tanks, etc.) having relatively high or low temperature. The terms "hot" and "cold" are not intended to refer to any particular temperature or range of temperatures, unless otherwise specifically noted.

Figure 1:
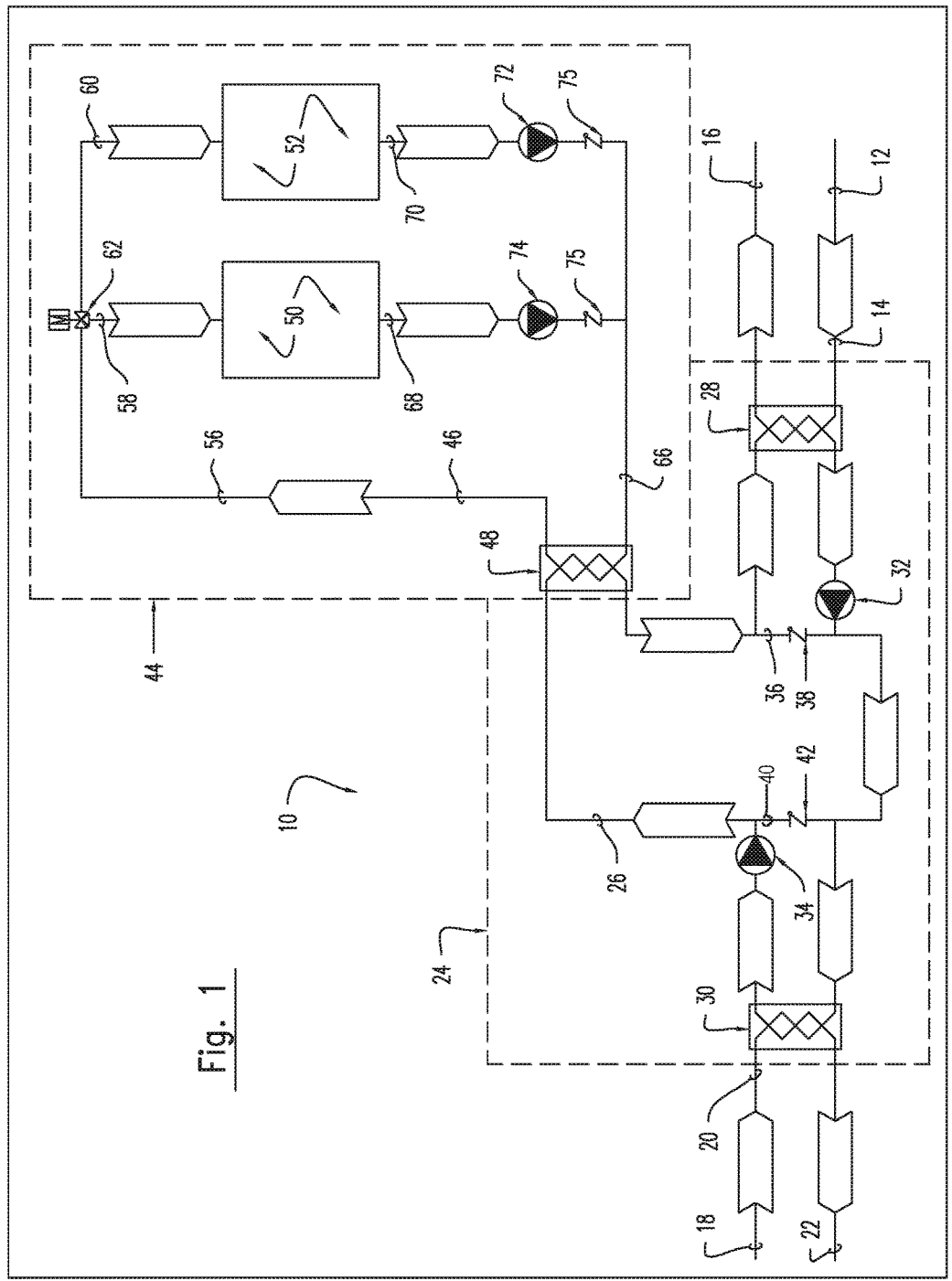
FIG. 1 is a schematic diagram of an apparatus embodying aspects of the present invention.

FIG. 1 is a schematic diagram of an apparatus 10 embodying aspects of the present invention. The illustrated apparatus 10 is designed to transfer heat from hot whey to cold milk. The hot whey is provided as a byproduct of the cheese-making process, and the cold milk is provided from a holding tank as an input to the cheese-making process.

The hot whey enters the apparatus 10 at a whey inlet 12 of a whey conduit 14. After heat is extracted from the hot whey, cold whey exits a whey outlet 16. Cold milk is provided from a holding tank as the primary raw ingredient for the cheese-making process. The cold milk enters a milk inlet 18 of a milk conduit 20. After being heated, hot milk exits a milk outlet 22.

In order to transfer heat from the hot whey to the cold milk, the apparatus 10 includes a heat exchange device 24 operatively positioned between the whey conduit 14 and the milk conduit 20. The heat exchange device 24 includes a heat transfer conduit 26 and a heat transfer medium designed to flow within the heat transfer conduit 26. In the illustrated embodiment, the heat transfer medium comprises water. Other substances can be used instead of or in addition to water, such as heat transfer oil or glycol.

A whey heat exchanger 28 is operatively positioned between the heat transfer conduit 26 and the whey conduit 14 such that heat will transfer from the hot whey to the heat transfer medium in the heat transfer conduit 26. Similarly, a milk heat exchanger 30 is operatively positioned between the heat transfer conduit 26 and the milk conduit 20 such that heat can transfer from the heat transfer medium to the cold milk in the milk conduit 20. Heat exchangers described in this patent application are preferably plate-type heat exchangers, but can be any suitable heat exchanger.

The heat exchange device 24 further includes a first exchange pump 32 for pumping water away from the whey heat exchanger 28, and a second exchange pump 34 for pumping water away from the milk heat exchanger 30. Each of the pumps can be turned on or off as needed for a particular mode of operation, as described below in more detail.

The heat transfer conduit 26 includes a whey bypass portion 36 and corresponding one-way check valve 38 that facilitates bypassing heat transfer medium around the whey heat exchanger 28. Similarly, a milk bypass portion 40 and corresponding one-way check valve 42 facilitates bypassing heat transfer medium around the milk heat exchanger 30.

The illustrated apparatus 10 further includes a thermal storage device 44 in communication with the heat exchange device 24. The thermal storage device 44 includes a thermal storage conduit 46 and a thermal storage medium positioned in the thermal storage conduit 46. In the illustrated embodiment, the thermal storage medium comprises water. Other substances can be used instead of or in addition to water, such as heat transfer oil or glycol.

A thermal storage heat exchanger 48 is operatively positioned between the heat exchange device 24 and the thermal storage conduit 46 to facilitate the transfer of heat between the heat exchange medium and the thermal storage medium. A cold storage tank 50 is designed to accumulate cold thermal storage medium, and a hot storage tank 52 is designed to accumulate hot thermal storage medium.

The thermal storage conduit 46 includes an upstream conduit portion extending from the thermal storage heat exchanger 48 to the hot and cold storage tanks 50,52. The upstream conduit portion includes a shared conduit portion 56 coupled to the thermal storage heat exchanger 48, a cold conduit portion 58 coupled to the cold storage tank 50, a hot conduit portion 60 coupled to the hot storage tank 52, and a valve device 62 coupled between the shared, cold, and hot conduit portions 56, 58, 60. In the illustrated embodiment, the valve device 62 is a motorized three-way control valve.

The thermal storage conduit 46 further includes a downstream conduit portion extending from the hot and cold storage tanks 50,52 to the thermal storage heat exchanger 48. The downstream conduit portion includes a shared conduit portion 66 coupled to the thermal storage heat exchanger 48, a cold conduit portion 68 coupling the shared conduit portion 66 to the cold storage tank 50, and a hot conduit portion 70 coupling the shared conduit portion 66 to the hot storage tank 52. The downstream conduit portion further includes a hot storage pump 72 for pumping hot water from the hot storage tank 52, and a cold storage pump 74 for pumping water from the cold storage tank 50. Check valves 75 prevent backflow of the thermal storage medium.

The above-described apparatus 10 is designed to work in three distinct modes of operation. In a mode called "coincident operation," heat from the hot whey flows through the heat exchange device 24 to the cold milk without being stored in the thermal storage device 44. In a mode called "whey cooling," heat from the hot whey flows through the heat exchange device 24 and into the thermal storage device 44, where it is stored in the hot storage tank 52 for future use. In a mode called "milk heating," heat from the hot storage tank 52 flows through the heat exchange device 24 to the cold milk. The mode of operation is dictated by the operation (and inoperation) of certain pumps combined with the position of the valve device 62. The details of each mode of operation are provided below.

Figure 2:
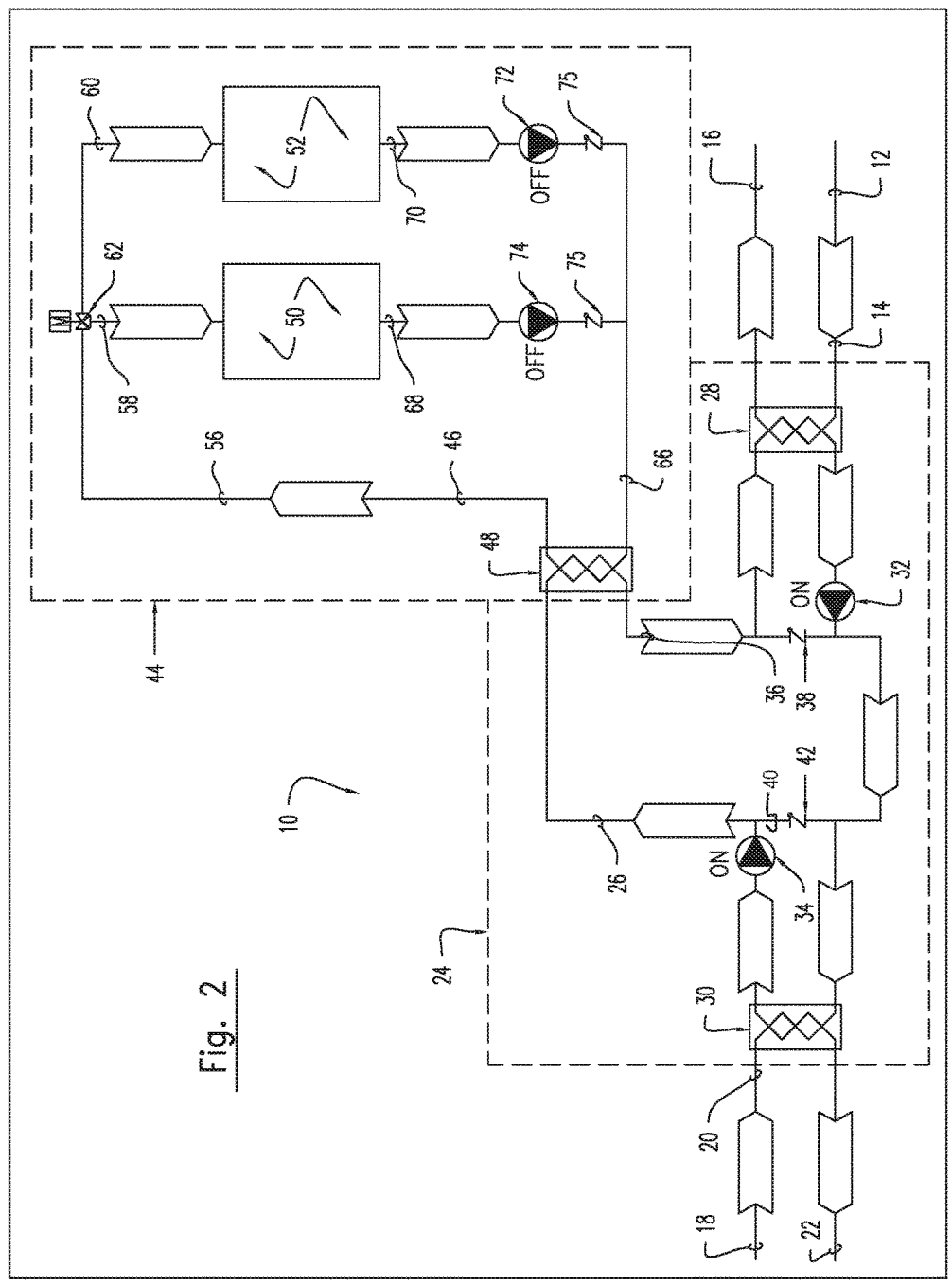
FIG. 2 the schematic diagram of FIG. 1 in a "coincident" mode.

In the coincident operation mode (FIG. 2), both the first exchange pump 32 and the second exchange pump 34 are on, and both the hot storage pump 72 and cold storage pump 74 are off. Due to the pressure from the adjacent pumps, both of the check valves 38,42 will remain closed and will prevent flow through the bypass portions 36,40. As a result, heat transfer medium will flow through both the whey heat exchanger 28 and the milk heat exchanger 30. However, because the hot and cold storage pumps 72,74 are off, thermal storage medium will not flow, and thus heat will not be accumulated in the thermal storage device 44. As can be understood by one skilled in the art, in the coincident operation mode, heat is transferred from the hot whey to the cold milk without the diversion of heat to the thermal storage device 44.

Figure 3:
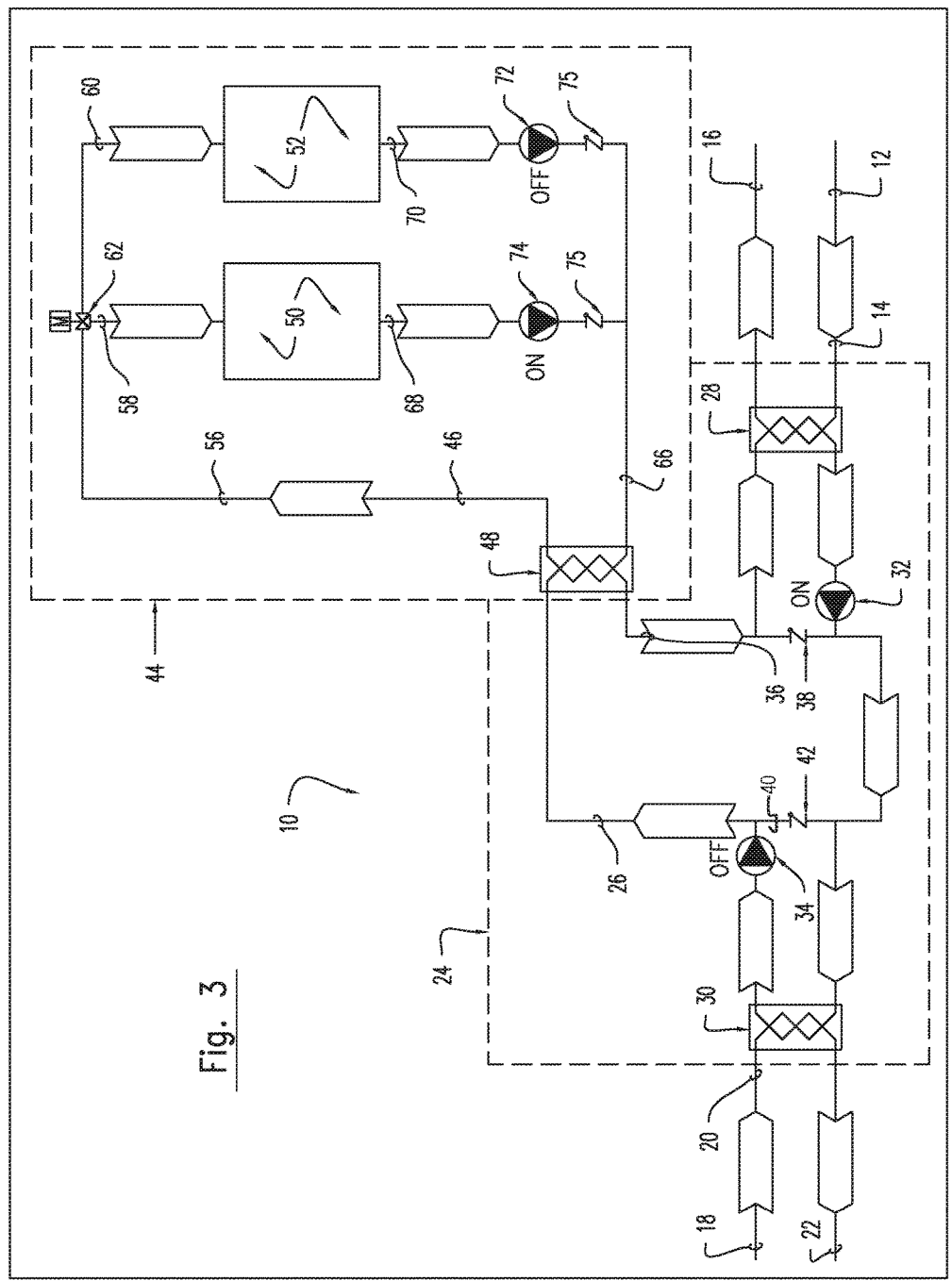
FIG. 3 the schematic diagram of FIG. 1 in a "whey cooling" mode.

In the whey cooling mode (FIG. 3), the first exchange pump 32 is on and the second exchange pump 34 is off. As a result of the second exchange pump 34 being off, flow through the milk heat exchanger 30 is inhibited, and thus heat exchange medium will flow through the milk bypass portion 40 and the corresponding check valve 42 will be open. Referring to the thermal storage device 44, in the whey cooling mode, the cold storage pump 74 is on and the hot storage pump 72 is off. In addition, the valve device 62 is positioned to prohibit flow to the cold storage tank 50 and allow flow to the hot storage tank 52. As can be understood by one skilled in the art, in the whey cooling mode of operation, heat from the hot whey is transferred through the whey heat exchanger 28 and to the heat transfer medium. The heat transfer medium is pumped to the thermal storage heat exchanger 48, where heat in transferred from the heat transfer medium to the thermal storage medium. The heated thermal storage medium (which was pumped from the cold storage tank 50) continues through the valve device 62, where it is directed to the hot storage tank 52. As a result, heat from the hot whey is stored in the hot storage tank 52. This mode of operation is used when hot whey is available, but no cold milk needs to be heated at that time.

Figure 4:
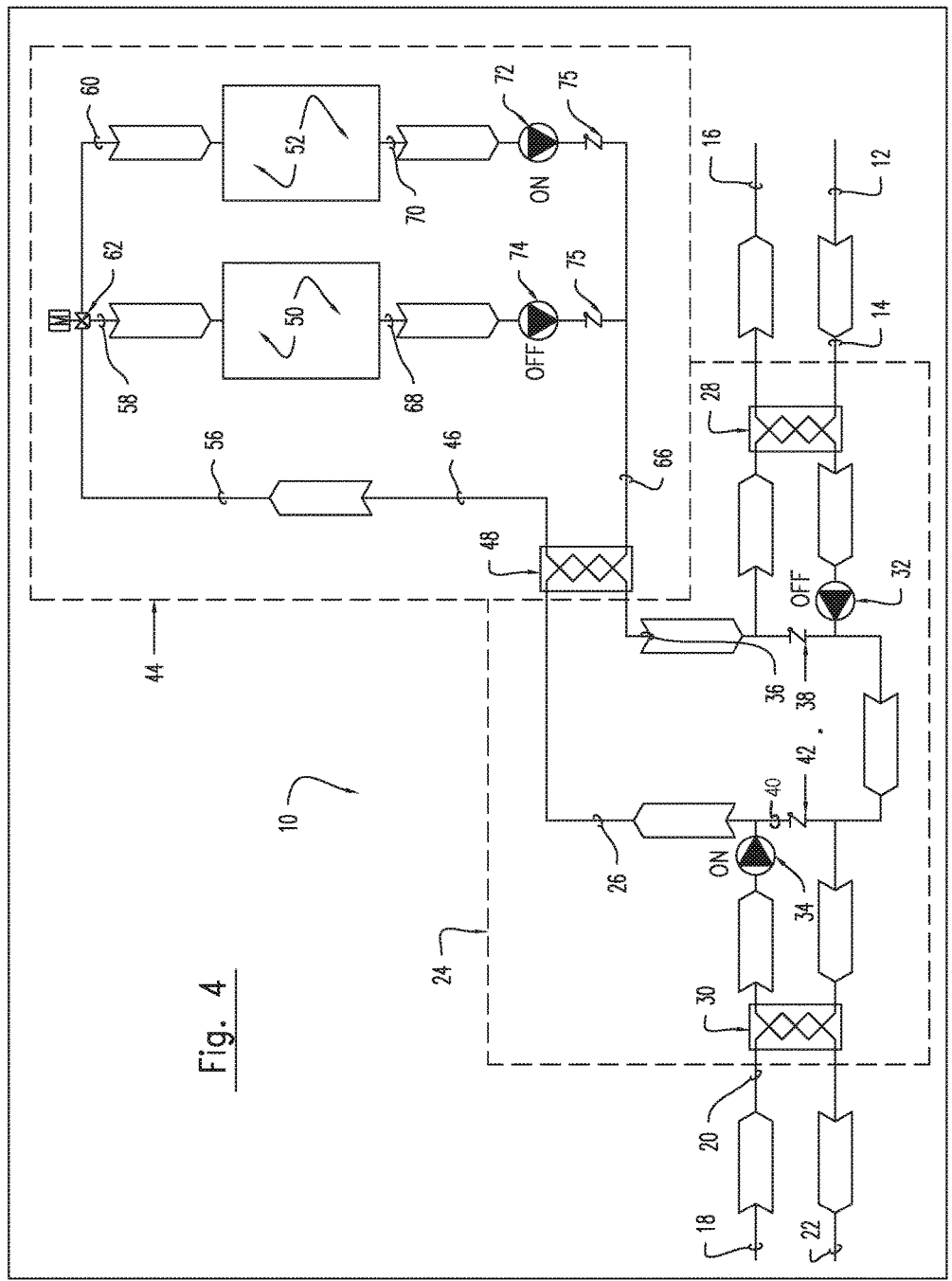
FIG. 4 the schematic diagram of FIG. 1 in a "milk heating" mode.

In the milk heating mode (FIG. 4), the first exchange pump 32 is off and the second exchange pump 34 is on. As a result of the first exchange pump 32 being off, flow through the whey heat exchanger 28 is inhibited, and thus heat exchange medium will flow through the whey bypass portion 36 and the corresponding check valve 38 will be open. Referring to the thermal storage device 44, in the milk heating mode, the cold storage pump 74 is off and the hot storage pump 72 is on. In addition, the valve device 62 is positioned to prohibit flow to the hot storage tank 52 and allow flow to the cold storage tank 50. As can be understood by one skilled in the art, in the milk heating mode of operation, heat from the hot storage tank 52 is transferred through the thermal storage heat exchanger 48 and to the heat transfer medium. The heat transfer medium is pumped to the milk heat exchanger 30, where heat in transferred from the heat transfer medium to the cold milk. The cold thermal storage medium (which was pumped from the hot storage tank and delivered heat to the heat transfer medium) continues through the valve device 62, where it is directed to the cold storage tank 50. As a result, heat from the hot storage tank 52 is used to heat cold milk. This mode of operation is used when cold milk needs to be heated, but hot whey is not available at that time.

The above modes of operation can be used to transfer heat from whey entering the apparatus at a temperature of about 112° F. and a flow rate of 35,000 lbs/hour to milk entering the apparatus at a temperature of about 40° F. and a flow rate of 40,500 lbs/hour. In the coincident mode of operation, the heat exchange medium is pumped at a rate of about 76 gal/min, which results in the heat exchange medium entering the whey heat exchanger at about 45° F. and exiting the whey heat exchanger at about 90° F. The result is that whey exits the apparatus at about 50° F. and milk exits the apparatus at about 85° F.

In the whey cooling mode of operation, the heat exchange medium is pumped at a rate of about 76 gal/min, which results in the heat exchange medium entering the whey heat exchanger at about 50° F. and exiting the whey heat exchanger at about 105° F. The thermal storage medium is similarly pumped at a rate of about 76 gal/min, which results in the thermal storage medium being heat from about 50° F. (in the cold storage tank) to about 100° F. (in the hot storage tank). The result is that the whey exits the apparatus at about 50° F.

In the milk heating mode of operation, the heat exchange medium is pumped at a rate of about 76 gal/min, which results in the heat exchange medium entering the milk heat exchanger at about 95° F. and exiting the milk heat exchanger at about 45° F. The thermal storage medium is similarly pumped at a rate of about 76 gal/min, which results in the thermal storage medium being cooled from about 100° F. (in the hot storage tank) to about 50° F. (in the cold storage tank). The result is that the milk and exits the apparatus at about 90° F.

Thus, the invention provides, among other things, an apparatus that can be operated in three modes of operation that allow heat from hot whey to be transferred to cold milk either extemporaneously or on a time-shifted basis. The result is a system that facilitates the efficient use of energy in the cheese-making process.

It should be understood that the illustrated apparatus is merely one way of practicing the present invention. For example, it can be envisioned that the heat transfer device and the thermal storage device could be integrated such that, with appropriate valves and conduits, the functions of those two device are performed by a single unit. In this case, it is possible that the functions of the heat transfer medium and thermal storage medium are accomplished by a single medium.

Various features and advantages of the invention are set forth in the following claims.

The invention claimed is:

1. An apparatus for making cheese comprising:
a whey conduit including a whey inlet for providing hot whey and a whey outlet for delivering cold whey;
a milk conduit including a milk inlet for providing cold milk and a milk outlet for delivering hot milk;
a heat exchanger operatively positioned between the whey conduit and the milk conduit to transfer heat between the hot whey and the cold milk; and
a thermal storage in communication with the heat exchanger, the thermal storage including,
a thermal storage conduit;
a thermal storage medium positioned in the thermal storage conduit; and
a thermal storage tank coupled to the thermal storage conduit, wherein the thermal storage is operable to transfer heat between the thermal storage medium and the heat exchanger, and
wherein the thermal storage tank comprises
a cold storage tank for accumulating cold thermal storage medium; and
a hot storage tank for accumulating hot thermal storage medium.

2. The apparatus of claim 1, wherein the thermal storage further includes:
a hot pump for circulating thermal storage medium from the hot storage tank; and
a cold pump for circulating thermal storage medium from the cold storage tank.

3. The apparatus of claim 1, wherein the thermal storage includes a thermal storage heat exchanger operatively positioned between the heat exchanger and the thermal storage conduit, the thermal storage heat exchanger operable to transfer heat between the thermal storage medium and the heat exchanger, the thermal storage conduit including an upstream conduit portion from the thermal storage heat exchanger to the hot and cold storage tanks, and
a downstream conduit portion from the hot and cold storage tanks to the thermal storage heat exchanger, wherein the downstream conduit portion includes:
a shared conduit portion coupled to the thermal storage heat exchanger;
a cold conduit portion coupling the shared conduit portion to the cold storage tank; and
a hot conduit portion coupling the shared conduit portion to the hot storage tank.

4. An apparatus for making cheese comprising:
a whey conduit including a whey inlet for providing hot whey and a whey outlet for delivering cold whey;
a milk conduit including a milk inlet for providing cold milk and a milk outlet for delivering hot milk;
a heat exchanger operatively positioned between the whey conduit and the milk conduit to transfer heat between the hot whey and the cold milk, the heat exchanger including a heat transfer circuit including
a heat transfer conduit,
a heat transfer medium positioned in the heat transfer conduit,
a whey heat exchanger operatively positioned between the whey conduit and the heat transfer conduit, and
a milk heat exchanger operatively positioned between the heat transfer conduit and the milk conduit; and
a thermal storage in communication with the heat exchanger, and
wherein the apparatus is operable in a coincident operation mode, such that heat is transferable from the hot whey to the cold milk via the heat transfer circuit without being stored in the thermal storage, wherein the thermal storage includes:
a thermal storage conduit;
a thermal storage heat exchanger operatively positioned between the heat exchanger and the thermal storage conduit;
a thermal storage medium positioned in the thermal storage conduit; and
a thermal storage tank coupled to the thermal storage conduit, wherein the thermal storage tank comprises:
a cold storage tank for accumulating cold thermal storage medium; and
a hot storage tank for accumulating hot thermal storage medium,
and wherein the thermal storage conduit comprises:
a shared conduit portion coupled to the thermal storage heat exchanger;
a cold conduit portion coupled to the cold storage tank;
a hot conduit portion coupled to the hot storage tank, and
a valve coupled between the shared, cold, and hot conduit portions.

5. The apparatus of claim 4, wherein the heat transfer conduit includes a milk bypass portion that bypasses the milk heat exchanger.

6. The apparatus of claim 4, wherein the heat transfer conduit includes a whey bypass portion that bypasses the whey heat exchanger.

7. The apparatus of claim 4, wherein the thermal storage further includes: a hot pump for circulating thermal storage medium from the hot storage tank; and a cold pump for circulating thermal storage medium from the cold storage tank.

* * * * *